J. H. FELTHOUSEN.
TURBINE.
APPLICATION FILED AUG. 31, 1918.

1,339,183.

Patented May 4, 1920.
3 SHEETS—SHEET 1.

Witnesses
Chas. S. Hyer.

Inventor
John H. Felthousen,
By
Attorney

J. H. FELTHOUSEN.
TURBINE.
APPLICATION FILED AUG. 31, 1918.

1,339,183.

Patented May 4, 1920.
3 SHEETS—SHEET 3.

Witnesses

Inventor
John H. Felthousen,
By
Attorney

UNITED STATES PATENT OFFICE.

JOHN H. FELTHOUSEN, OF YORK, PENNSYLVANIA, ASSIGNOR TO S. MORGAN SMITH COMPANY, OF YORK, PENNSYLVANIA, A CORPORATION OF PENNSYLVANIA.

TURBINE.

1,339,183.   Specification of Letters Patent.   Patented May 4, 1920.

Application filed August 31, 1918. Serial No. 252,200.

*To all whom it may concern:*

Be it known that I, JOHN H. FELTHOUSEN, a citizen of the United States, residing at York, in the county of York and State of Pennsylvania, have invented new and useful Improvements in Turbines, of which the following is a specification.

This invention relates to turbines, and particularly to means for controlling the discharge water through the draft tube from the runner.

It is well known that the water supplied in the usual manner through gates to the runner of a turbine is formed into a hollow column with which air is entrained, and when this hollow water column leaves or is discharged from the runner toward and into the draft tube with the air it comes together and is supposed to merge into and form a solid water column, the mergence of the water causing eddies and counter currents to be produced close to the runner and within the draft tube, with consequent detriment to the operation of the runner and draft tube and the general efficiency of turbines.

The present invention has for its principal object to overcome the disadvantage specified by regularly maintaining the water in hollow column formation through the full extent of the draft tube, or, from the discharge end of the runner to the outlet extremity of the draft tube, and to carry the entrained air along therewith, and thereby prevent the water from eddying or swirling adjacent to the runner and in the draft tube and transfer such turbulent condition of the water externally of the draft tube in the tail race or tail race pit where it will not in the least affect the runner.

A further object of the invention is to provide simple means that may be readily associated with the runner and draft tube of a turbine for efficiently liberating and discharging water from the runner to avoid any counteracting influence of the water on the runner after regularly operating in conjunction with the latter.

The invention consists in the preferred construction, arrangement and adaptation hereinafter described and shown in the accompanying drawings to demonstrate the practical application of the invention in various structural forms.

In the drawings:—

Fig. 4 is a detail longitudinal section taken in the plane of the line 4—4, Fig. 1.

Figure 1:
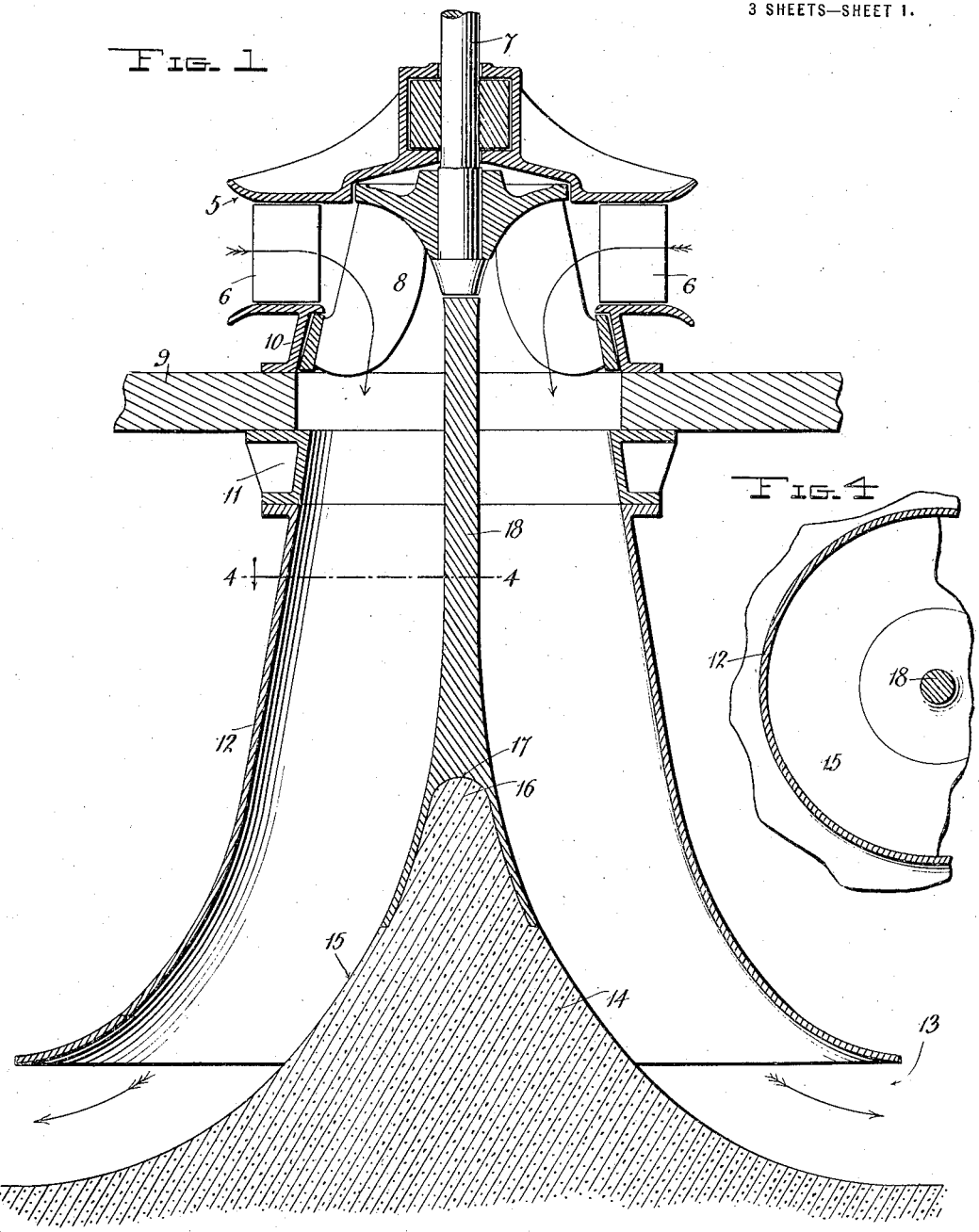
Figure 1 is a transverse section through a part of a turbine installation embodying the features of the invention.

The numeral 5 designates a turbine of usual construction comprising gates 6 and a shaft 7 having a runner 8 suitably mounted on the lower end thereof. The shaft 7 will be equipped with well known means for suspending the same, and in turn holds the runner 8 in operating position relatively to the gates 6. As shown by Figs. 1 and 3, the turbine and its components are supported by a flume bed or floor 9 through the medium of casing elements or rings 10 and 11. These structural features are similar in all the forms of the improvement illustrated by Figs. 1, 2 and 3.

As shown by Fig. 1, a draft tube 12 depends from the casing element or ring 11 downwardly any suitable distance, said draft tube flaring gradually toward its lower edge or bell-mouthed outlet. From the bottom of the race pit 13 a concrete conical support 14 extends a distance upwardly into the draft tube in central relation to the latter, the surface 15 of this support being curved, as shown. Over the apex 16 of the support is fitted a socket 17 at the lower end of a metallic stem 18 extending upwardly through the center of the draft tube, and terminating close to but not engaging the hub of the outlet end of the runner 8. The stem 18 tapers from the socket 17 upwardly for a portion of its length so as to approximately follow the contour of the inner surface of the draft tube for a portion of its length. However, this similarity of contour is not essential, the main feature being the projection of the stem upwardly through the center of the draft tube and terminating close to the central portion of the runner.

Figure 2:
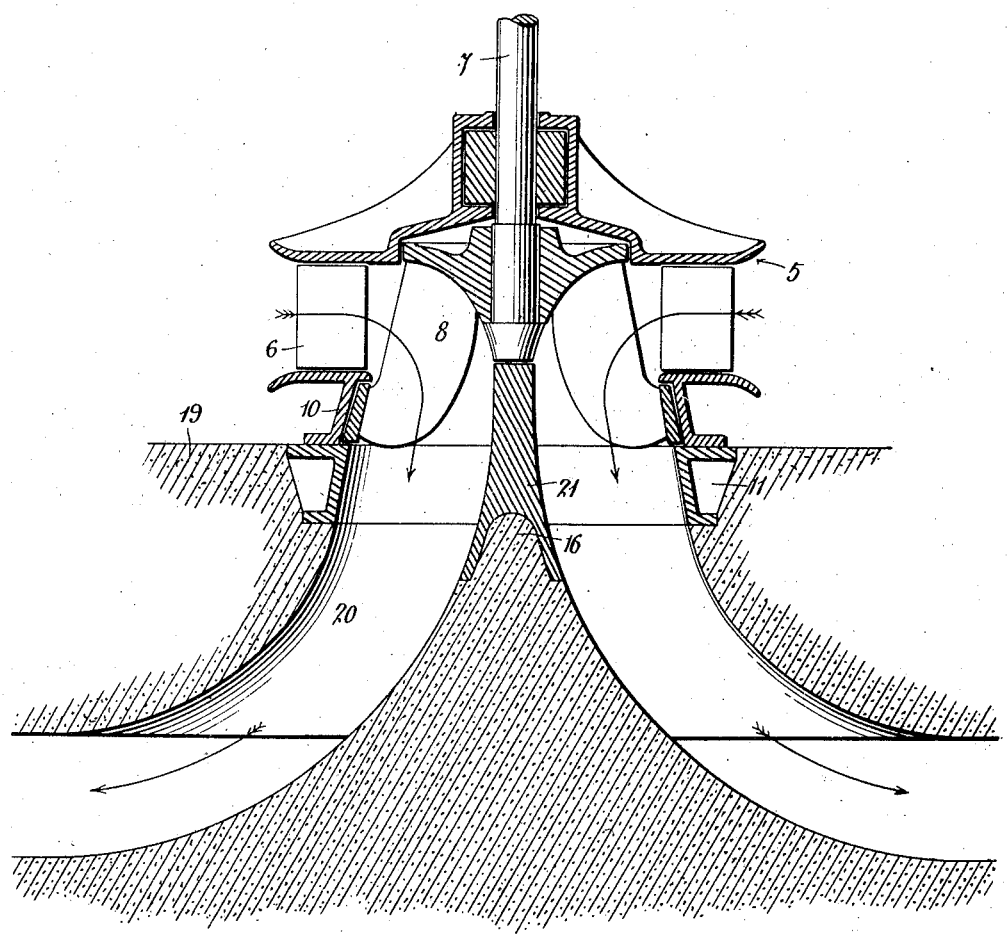
Figs. 2 and 3 are similar views illustrating modified installations embodying the invention.
Figure 3:
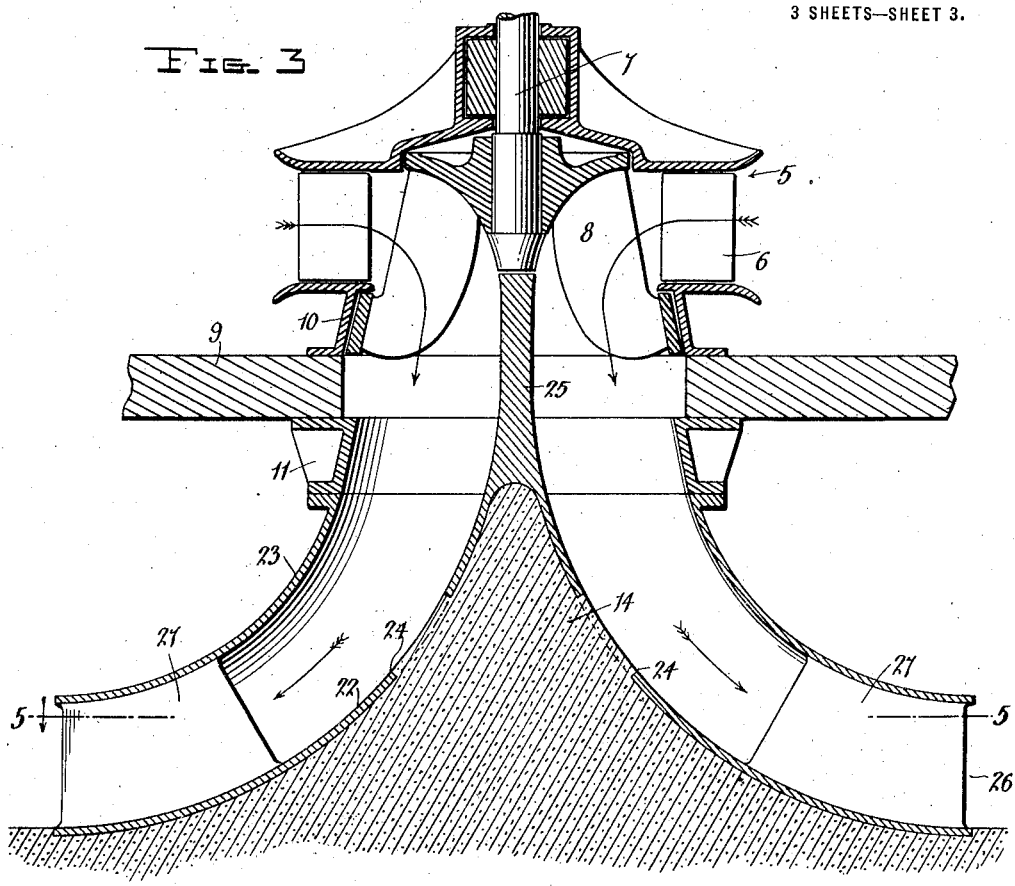

In the modification shown by Fig. 2, the turbine is installed on a concrete support 19 with the casing element or ring 11 embedded therein, and the draft tube in this instance is shorter than that shown by Fig. 1 and provided by a downwardly flared passage 20 formed in the said support, the central conical support 14 from the bottom of the race pit similar to that shown by Fig. 1 projecting upwardly into the passage 20. On the apex of the support 14 a stem 21, shorter than that shown by Fig. 1, is mounted and similarly terminates close to the hub or central portion of the outlet end of the runner.

Figure 5:
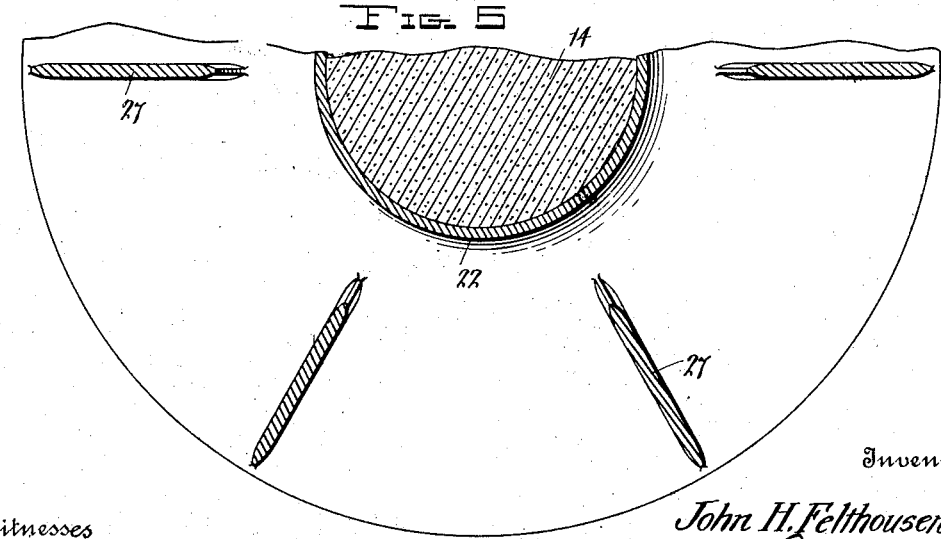
Fig. 5 is a detail horizontal section showing a portion of the outlet extremity of the draft tube and taken in the plane of line 5—5, Fig. 3.

In the modified structure shown by Fig. 3, the draft tube is comparatively short and is composed of inner and outer metal walls 22 and 23 in concentric relation, the inner wall 22 forming an enlarged socket or inclosure over the concrete support 14 which is filled in through openings 24 formed in the said inner wall 22. The inner wall 22 has a stem 25 integrally formed with and rising therefrom and terminating close to the center of the outlet end of the runner. The two walls 22 and 23 and the stem 25 are preferably formed integral, or as a single casting. The turbine structure above the draft tube is installed on a flume bed or floor 9 in the same manner as illustrated by Fig. 1, the weight of the structure, however, being sustained on the support 14. The lower outlet 26 of the draft tube is reinforced by radial ribs 27 of the form shown by Fig. 5 and extending into and arranged at intervals in the outlet and also acting to sustain the weight strain and materially strengthen the tube.

The operation of the improved turbine structure in its various forms hereinbefore described is as follows:—The water inflowing through the gates 6 strikes the blades of and actuates the runner, the rotation of the runner forming the water into hollow column with entrained air which follows along therewith and passes downwardly through the draft tube around the stem and is discharged through the lower outlet of the draft tube into the tail race without disturbing or breaking up its hollow columnar formation, and thereby eddies and counter currents are prevented from being formed at the center close to and below the runner and within the draft tube. The hollow column of water does not break and swirl or eddy until it is liberated in the tail race and will, therefore, have no counteracting effect whatever on the turbine. By this means the discharge of the water from the runner is carried on regularly and in a manner which avoids counteraction at or adjacent to the outlet end of the runner and the full driving impact and draft tube effect of the water on the runner ensues without modification or power deterioration.

What is claimed as new is:—

1. In a turbine, the combination with a runner, of a draft tube of comparatively short length and having a maximum flare at its outlet end, a stationary means extending into the draft tube from the direction of its flared outlet end and disposed centrally therein and terminating close to the center of the discharge end of the runner to maintain a hollow column of water from the runner to the outlet of the draft tube.

2. In a turbine, the combination with a runner and water supply means, of a vertical draft tube, and a stationary support and stem extending into the outlet end of the draft tube and terminating close to the discharge end of the runner to form an annular passage from the runner to the outlet extremity of the draft tube to maintain a hollow column of water from the discharge end of the runner fully through the outlet extremity of the draft tube and to provide for a rapid discharge of the water from the draft tube.

3. In a turbine, the combination with a runner and water supply means therefor, of a draft tube having a very wide and flared outlet extremity, a conical support projecting into the flared outlet of the draft tube, and a stem continuing from the said support and terminating close to the discharge end of the runner to form an annular passage from the runner to the outlet extremity of the draft tube to maintain a hollow column of water from the discharge end of the runner fully through the outlet extremity of the draft tube.

4. In a turbine, the combination with a runner and water supply means therefor, of a draft tube with a flaring outlet extremity, and a conical support extending into the flared outlet of the draft tube from a point beyond the said outlet and continued by a centrally disposed stem which terminates close to the discharge end of the runner, the support and the stem being shaped to conform to the inner contour of the draft tube and to provide an annular passage which regularly flares from the discharge end of the runner fully to the outlet of the draft tube to maintain the water discharged from the runner in the form of a hollow column until it is discharged from and delivered beyond the outlet extremity of the tube.

5. The combination with a runner and a draft tube of a turbine, of fixed central means extending the full length of the draft tube and outwardly beyond the flared outlet of said tube and also terminating close to the center of the runner to maintain the water discharged through the draft tube in the form of a hollow column until liberated from the outlet extremity of the tube.

In testimony whereof I have hereunto set my hand in presence of two subscribing witnesses.

JOHN H. FELTHOUSEN.

Witnesses:
A. J. GLOSSBRENNER,
C. C. FREY.